No. 782,978. PATENTED FEB. 21, 1905.
W. T. MAGRUDER.
POWER TRANSMISSION DEVICE.
APPLICATION FILED JAN. 19, 1904.
2 SHEETS—SHEET 1.
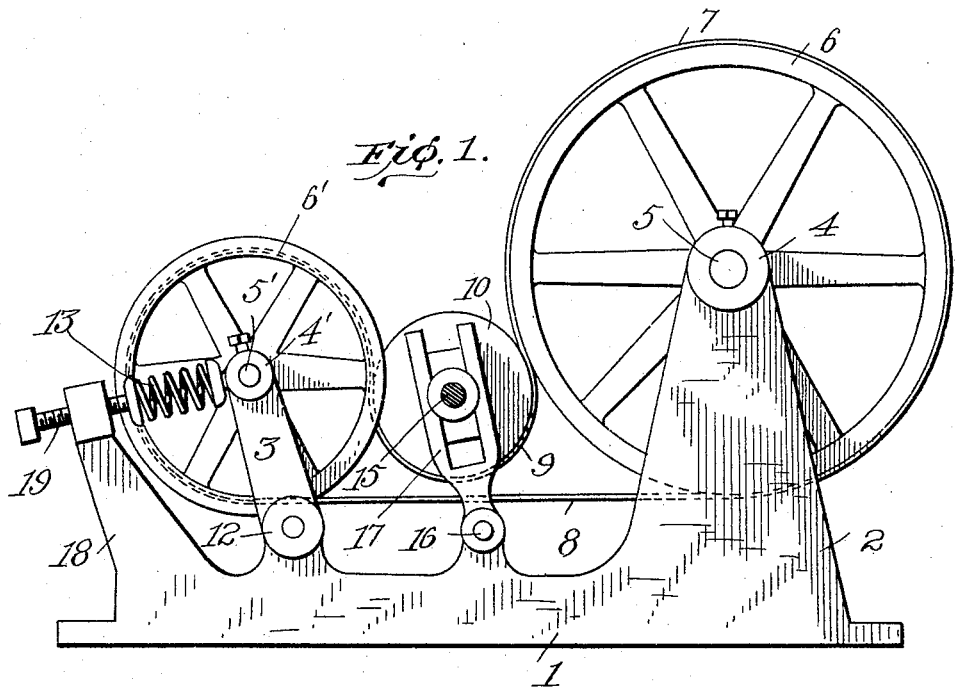
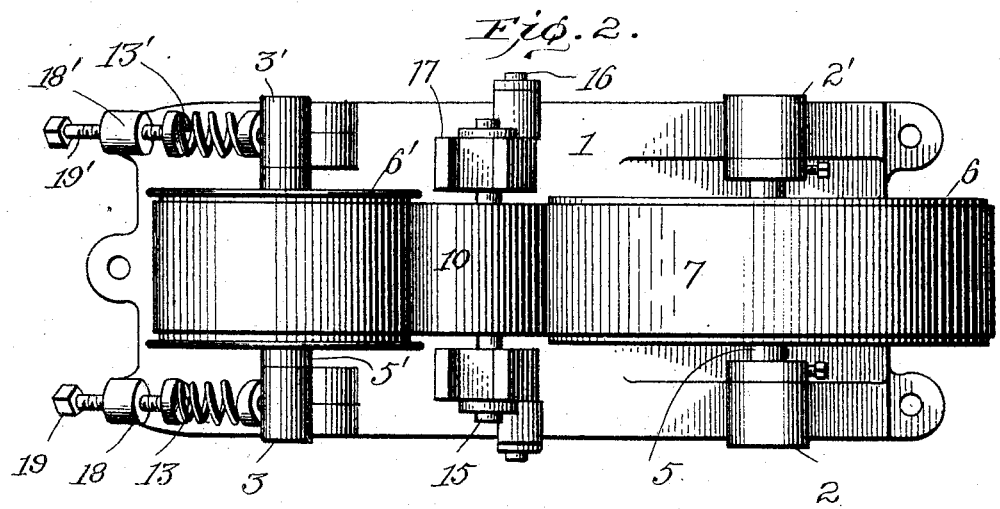
Witnesses
J. M. Fowler Jr.
Edwin L. Yewell
Inventor
William T. Magruder
By W. E. Schoenborn
Attorney No. 782,978. PATENTED FEB. 21, 1905.
W. T. MAGRUDER.
POWER TRANSMISSION DEVICE.
APPLICATION FILED JAN. 19, 1904.

2 SHEETS—SHEET 2.

Witnesses
J. M. Fowler Jr.
Edwin L. Yewell

Inventor
William T. Magruder,
By W. T. Schoenborn
Attorney

No. 782,978.

Patented February 21, 1905.

UNITED STATES PATENT OFFICE.

WILLIAM T. MAGRUDER, OF COLUMBUS, OHIO, ASSIGNOR OF ONE-HALF TO JAMES WENDELL COLE, OF COLUMBUS, OHIO.

POWER-TRANSMISSION DEVICE.

SPECIFICATION forming part of Letters Patent No. 782,978, dated February 21, 1905.

Application filed January 19, 1904. Serial No. 189,742.

*To all whom it may concern:*

Be it known that I, WILLIAM T. MAGRUDER, a citizen of the United States, residing at Columbus, in the county of Franklin and State of Ohio, have invented certain new and useful Improvements in Power-Transmission Devices, of which the following is a specification.

My invention relates to improvements in power and motion transmission devices in which pulleys or the like and belts or equivalent flexible transmission-gearing are relatively arranged and connected so that the belts or flexible transmission-gear are kept at a uniform tension and friction with the driving and driven pulleys and wherein the tightener for the transmission-gearing has an additional function of transmitting the power and motion from the driving to the driven pulley through the interposed flexible gearing in the same manner as in friction-gearing.

The object of my invention is to provide a compact, simple, and highly-efficient apparatus for the transmission of motion and power with the least loss due to frictional resistances and slip of the belt and friction in the bearings of the pulley-shafts; also, to provide an inexpensive construction especially adapted for shafts located near to each other for reducing the speed of rotation of shafting in the transmission of power from an electric motor, steam, or water turbine to a line of shafting or from a slow-running machine, such as a water-wheel or reciprocating engine, to a fast-revolving shaft, such as that of an electric generator, woodworking-machine, and the like.

The improvements consist in the construction, arrangement, and combination of the several parts and details as will be hereinafter fully set forth, and specifically pointed out in the appended claims.

Figure 3:
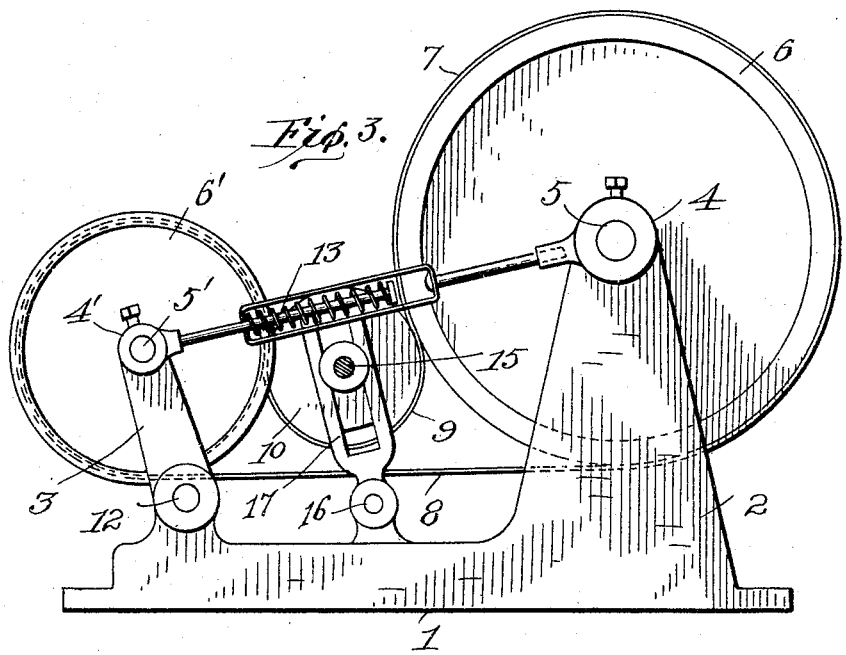
Figure 4:
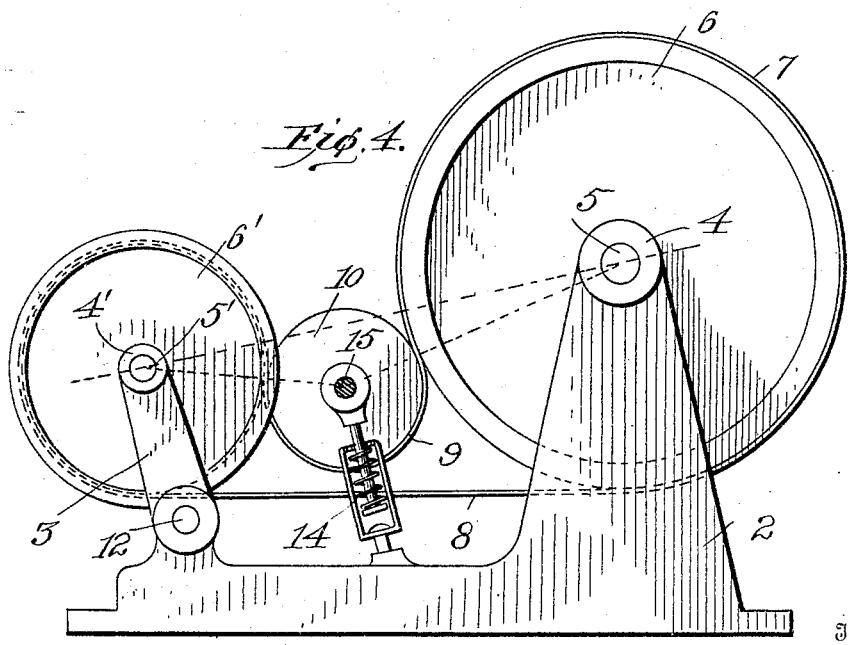

Figure 1 is a side elevation of one form of my power and motion transmission device. Fig. 2 is a plan view of Fig. 1. Figs. 3 and 4 are side elevations of modified forms of the invention.

Similar numerals throughout the several figures of the drawings represent similar parts of the device.

1 indicates the usual base of the frame of the apparatus, which may be secured to a firm foundation in any suitable manner. 2 2' and 3 3' are standards or supports, one on each side of the ends of the base, which are provided with bearings 4 4', supporting parallel shafts 5 5', respectively. Attached to or revolving on said shafts are pulleys 6 6', either of which may be the driving or driven pulley, and said pulleys 6 6' and combined tightener and friction pulley 10, to be hereinafter described, can all be of the same or of different sizes, and one or more of them can have flanges.

In Figs. 1, 2, 3, and 4 the standards 3 3' are shown pivoted to the base at 12 and the standards 2 2' are fixed. This arrangement may be reversed, or both standards may be pivoted.

I wish it to be distinctly understood that I do not care to limit myself to the construction and arrangement of pivoting the standards or bearings of the pulleys 6 6', as any other means could be adopted—such as, for example, a fork-shaped casting supporting the bearings and having a single hinged connection with the base or a straight line slide working in a guide.

The centers of the two pulleys 6 6' are made to approach or recede from each other automatically by springs 13 13' on each side of the device. Figs. 1 and 2 show the strength of the springs 13 13', controlled by adjusting-screws 19 19', passing through the abutments 18 18'. In Fig. 3 the springs 13 13' are attached to the opposite standard or section of the framing, and the compression of the springs could be controlled in any suitable manner, as would be readily suggested by those skilled in the art. This form could be also changed by attaching the fixed end of the springs 13 13' to any portion of the standard 2 or its base or by a tension-spring. Another means which readily suggests itself for accomplishing the same result is to have the ends of the shafts supporting the pulleys 6 6' attached to blocks which are guided in slots on fixed standards or frames, said slots and controlling-springs so arranged as to permit the centers of pulleys 6 6' to automatically approach to or recede from each other in the same manner as shown in the drawings.

An endless and flexible transmission-belt 7 is made to pass from the pulleys 6 6' and of such a length to have interposed between the pulleys a straight run or section 8 and a depressed run or section 9. Adjustably supported and in contact with said depressed section is a tightener-pulley 10. In Figs. 1 and 2 this tightener-pulley is provided with a shaft 15, whose bearing is guided in two frames 17, one on each side and pivoted to the base 1 at 16. In Fig. 3 the tightener belt-pulley 10 is simply supported in the depressed section with a guide or support 17 for its shaft 15 hinged to base 1 at 16, and the springs 13 13' cause the pulleys 6 6' to approach each other and grip the tightener-pulley 10 and prevent it from passing out between them, thereby assuming the same position and relation with respect to the flexible gearing 7 and the pulleys 6 6' as in Figs. 1 and 2. Fig. 4 shows means for adjusting the centers of the pulleys 6 6' through the medium of the endless belt 7, which connects these pulleys, and is effected by attaching one end of a spring 14 or equivalent means on each end of the shaft 15 of the interposed tightener-pulley 10 and its other end to the base 1 in such a manner that the pulley is permitted to rotate freely and at the same time puts the depressed section of the belt under tension, thereby causing the pulleys 6 6' to approach each other and so grip pulley 10 between them and through the flexible belt 9.

It has been found in practice that the weight of the tightener-pulley 10 in some cases is sufficient to draw by means of the connecting flexible belt the pulleys 6 and 6' together, so as to create the necessary friction and also tighten the belt to transmit the necessary power. The weight of the tightener-pulley in such cases acts in the same manner and is the mechanical equivalent of the springs 13 or 14. In such case said springs may be omitted from the apparatus.

From the foregoing description of Figs. 1, 2, 3, and 4 it will be seen that the center of the tightener-pulley 10, as indicated by the dotted lines in Fig. 4, is between the line connecting the centers of the driving and driven pulleys 6 6' and the straight section 8 of the connecting flexible belt.

It will be seen from the foregoing disclosure that in all the figures illustrating my invention the combined tightener and friction pulley assumes the same relation and effective position with respect to the driving and driven pulleys and their connecting flexible transmission-gearing. Likewise it will be noticed that the combined belt-tightener and friction pulley is adjustably supported by and in contact with the depressed section of the flexible transmission-gearing and being arranged parallel and so proportioned with respect to the separated driving and driven pulleys that when the tightener-pulley automatically shifts it will take up any extra length or stretching of the flexible transmission gearing or belt and at the same time bear with a uniform pressure against a section of the flexible gearing passing over each of the other two pulleys.

The relation and direction of movement and rotations of the several parts composing the apparatus are such that no retarding of effort or unnecessary friction is produced; but, on the contrary, the effect is not only of belt-transmission, but the tightener-pulley performs at the same time the functions of friction-gearing by coming in contact with the belt-section on the driving-pulley and also that of driven pulley. It will be seen that this frictional power is transmitted from one pulley to the other through the belt normal to its surface just as if the pulleys were covered with leather or other flexible material and the frictional or rolling thrust transmitted through the moving belt-sections on the driving and driven pulleys is in the directions of the straight lines passing through the centers of the driving or driven pulleys and the center of the tightener-pulley, as indicated by dotted line in Fig. 4.

It is also desired to be understood that I do not restrict myself in having either the pulley 6 or 6' the driving-pulley, as it will be readily seen that the tightener frictional pulley 10 could be made to receive the initial power and could transmit the same to the pulleys 6 and 6' and perform the same function of a tightener-pulley.

It has been found in practice that a belt of a given width and thickness traveling at a given speed and with a given initial tension will transmit a greater horse-power when provided with the herein-disclosed arrangement of pulleys and tightener friction-pulley than when power is transmitted by the same belt running over the same pulleys without my arrangement of tightener friction-pulley.

It will also be seen that I have devised a transmission-gearing in which the forces set up between the journals 5 and 5' and their bearings 4 and 4' by the endless belt 7 are opposed by the forces set up in the same places by the tightener friction-pulley 10, and that therefore the work of friction in rotating the shafts 5 and 5' in their bearings 4 and 4' is much less than it usually is in flexible transmission or in friction gearing when there is no counter resistance to the forces creating the frictional resistance in the different bearings. Similarly, the forces acting upon the tightener belt-pulley and its shaft—namely, the pull of the belt on its two sides and the reactions of the driving and driven pulleys to balance each other—are such that the frictional resistances between the journals and bearings are very nearly equalized and the forces developed throughout the designed structure approach an equalization of forces more nearly than in previous devices of this class of inventions.

Having thus described my invention, what I claim as new, and desire to secure by Letters Patent, is—

1. In a flexible belt and friction-gearing device for the transmission of motion and power, the combination of two separate and parallel pulleys, an endless and flexible transmission-belt connecting the pulleys having a straight and a depressed run or section between said pulleys, an interposed and automatically-adjusted belt-tightener and friction-pulley resting within said depressed run or section of belt, the center of said belt-tightener and friction-pulley lying between the line passing through the centers of the separated pulleys and the said straight section or run of the belt and gripping said belt between each of the separated pulleys and the intermediate tightener-pulley.

2. In a flexible belt and friction-gearing device for the transmission of motion and power, the combination of two separated and parallel pulleys, an endless and flexible transmission-belt connecting said pulleys having a straight and a depressed run or section spanning the space intervening the pulleys, a combined belt-tightener and friction-pulley resting within the depressed run or section of belt, the center of said belt-tightener and friction-pulley lying between the line passing through the centers of the separated pulleys and the said straight section of the belt, and means for yieldingly and adjustably drawing said belt-tightener down into the depressed section of belt and gripping said belt between each of the separated pulleys and the intermediate tightener-pulley.

3. In a flexible belt and friction-gearing device for the transmission of motion and power, the combination of two separated and parallel pulleys, supporting means adapted to permit the distance between the centers of the said pulleys to vary, a flexible transmission-belt spanning the space intervening said pulleys, a combined belt-tightener and frictional pulley resting on one of the spanning runs or sections of the flexible belt, and means for forcing said friction-pulley against the flexible belt and gripping said belt between each of said separated pulleys and the friction-pulley.

4. In a flexible belt and friction-gearing device for the transmission of power and motion, the combination of a driving-pulley, a driven pulley, a flexible and endless belt having a depressed section between and connecting the driving and driven pulleys, an automatically-adjusted frictional transmission-pulley resting within said depressed section of the belt, the center of the frictional transmission-pulley lying between the line passing through the centers of the driving and driven pulleys and a line below the frictional transmission-pulley and tangent to the driving and driven pulley, and means for yieldingly holding said frictional transmission-pulley upon the belt and gripping the belt between the frictional transmission-pulley and each of the driving or driven pulleys.

5. In a flexible belt and friction-gearing device for the transmission of power and motion, the combination of two separated and parallel pulleys, supporting means adapted to permit the distance between the centers of said pulleys to vary, an endless and flexible transmission-belt having a straight and a depressed run or section between and connecting said pulleys and an interposed tightener-pulley within said depressed run or section of flexible belt and gripped by the separated pulleys through the flexible belt.

6. In a power or motion transmitting device, the combination of an automatically-adjusted pulley and a fixed pulley, an endless and flexible transmission-belt having a straight and a depressed run or section between and connecting said pulleys and an interposed tightener and friction pulley within said depressed run or section of the flexible belt and gripped by the adjustable and fixed pulleys through the flexible belt.

7. In a power or motion transmitting device, the combination of a fixed pulley, a yieldingly-supported pulley, means for adjusting said yielding pulley toward said fixed pulley, an endless and flexible transmission-belt having a straight and a depressed run or section between and connecting said pulleys, and an interposed tightener and friction pulley within said depressed run or section of flexible belt and gripped by the fixed and yieldingly-supported pulleys through the flexible belt.

8. In a power or motion transmitting device, the combination of a fixed pulley, a movable pulley, an adjusting-spring tending to move said movable pulley toward said fixed pulley, an endless and flexible transmission-belt having a straight and a depressed run or section between and connecting said pulleys and an interposed tightener and friction pulley within said depressed run or section of flexible belt and gripped by the fixed and the spring-actuated pulleys through the flexible belt.

9. In a power or motion transmitting device, the combination of two parallel and separated pulleys, means for supporting said pulleys to permit the distance between their centers to increase or decrease, an endless and flexible transmission-belt having a straight and a depressed run or section between and connecting said separated pulleys, and an interposed and adjustably-controlled tightener friction-pulley supported in said depressed run or section of flexible belt and gripped by the separated and movable pulleys through the flexible belt.

10. In a power or motion transmitting device, the combination of two parallel and separated pulleys, means for supporting said pulleys and permitting the distance between their centers to increase or decrease, an endless and flexible belt connecting the pulleys having a straight and a depressed run or section between said pulleys, an interposed and automatically-adjusted belt-tightener pulley within said depressed run or section of belt, the center of said tightener-pulley lying between the line passing through the centers of the separated pulleys and the said straight section of the belt.

11. In a flexible belt and frictional gearing device for the transmission of motion and power, the combination of two separated and parallel pulleys, an endless and flexible transmission-belt connecting the pulleys and having a straight and a depressed run or section between said pulleys, a combined belt-tightener and friction-pulley interposed between the separated pulleys and resting within the depressed run or section of belt, the center of said belt-tightener and friction-pulley lying between the line passing through the centers of the separated pulleys and the straight section or run of the belt, and means for yieldingly forcing the belt-tightener and frictional pulley against the depressed belt-section and thereby gripping the belt between the tightener and separated pulleys.

12. In a flexible belt and frictional gearing device for the transmission of motion and power, the combination of two separated and parallel driven pulleys, an endless and flexible transmission-belt connecting the separated pulleys and having a straight and a depressed run or section between said pulleys, an intermediate driving-pulley resting within the depressed run or section of belt, the center of said driving-pulley lying between the line passing through the centers of the separated pulleys and the straight section or run of the belt, and means for yieldingly forcing said intermediate driving-pulley against the depressed belt-section and thereby gripping the belt between the driving and separated pulleys.

13. In a flexible belt and frictional gearing device for the transmission of motion and power, the combination of two separated and parallel driven pulleys, means for varying the distance between the centers of the said driven pulleys, an intermediate driving-pulley, a flexible transmission-belt interposed between the said separated pulleys and the intermediate pulley and means for yieldingly forcing said intermediate driving-pulley against said flexible belt and said flexible belt against the separated pulleys, thereby gripping said belt between said intermediate and each of the separated pulleys.

14. In a flexible belt and friction-gearing device for the transmission of power and motion, the combination of two separated and parallel driven pulleys, means for varying the distance between the centers of said driven pulleys, an endless and flexible transmission-belt having a straight and a depressed run or section between and connecting said pulleys, and an intermediate driving-pulley within said depressed run or section of flexible belt and gripped by the separated driven pulleys through the flexible belt.

15. In a flexible belt and friction-gearing device for the transmission of motion and power, the combination of two separated and parallel pulleys, supporting means for said separated pulleys adapted to permit the distance between their centers to increase or decrease, a flexible transmission-belt passing around and having upper and lower runs spanning the space intervening said separated pulleys, a combined belt-tightener and frictional pulley resting on the upper run of said flexible belt and gripping said belt between each of the separated pulleys and the friction-pulley.

In testimony whereof I affix my signature in presence of two witnesses.

WILLIAM T. MAGRUDER.

Witnesses:
 FRANK M. RAYMUND,
 DAVID T. KEATING.